US007392216B1

(12) United States Patent
Palmgren et al.

(10) Patent No.: US 7,392,216 B1
(45) Date of Patent: Jun. 24, 2008

(54) METHODS AND APPARATUS FOR UTILIZING A PROPORTIONAL HAZARDS MODEL TO EVALUATE LOAN RISK

(75) Inventors: Matt Andrew Palmgren, Raleigh, NC (US); Christian John Wypasek, Mint Hill, NC (US)

(73) Assignee: GE Capital Mortgage Corporation, Raleigh, NC (US)

( * ) Notice: Subject to any disclaimer, the term of this patent is extended or adjusted under 35 U.S.C. 154(b) by 1566 days.

(21) Appl. No.: 09/671,005

(22) Filed: Sep. 27, 2000

(51) Int. Cl.
*G06Q 40/00* (2006.01)
(52) U.S. Cl. ........................................... 705/37
(58) Field of Classification Search ............... 701/40; 705/35–45
See application file for complete search history.

(56) References Cited

U.S. PATENT DOCUMENTS

| | | | | |
|---|---|---|---|---|
| 5,732,400 | A | 3/1998 | Mandler et al. | 705/26 |
| 5,797,133 | A | 8/1998 | Jones et al. | 705/38 |
| 5,812,988 | A | 9/1998 | Sandretto | 705/36 |
| 5,930,776 | A | 7/1999 | Dykstra et al. | 705/38 |

OTHER PUBLICATIONS

Ciochetie et al. A proportional Hazards Model of Commercial Mortgage Default with Originaot Bias, Mar. 2001.*
Follain et al., Ruthless Prepayment, Center for Policy Research, Syracuse, New York. 1996.*
Deng, Mortgage Termination: An Empirical Hazard Model with Stochastic Term Structure, 1997.*
Yao, Rui, Resume; http://faculty.baruch.cuny.edu/ryao.
Yao, Rui, Abstract from "A Proportional Hazard Model of Commercial Mortgage Default and Prepayment", Asian Real Estate Society Annual Meeting, Beijing, Jul. 2000.
*SAS Technical Report P-229*, V.6.07, pp. 435-479.
*Survival Analysis Techniques for Censored and Truncated Data*, John P. Klein and Melvin L. Moeschberger (1997).
*Counting Processed & Survival Analysis*, Thomas R. Fleming and David P. Harrington (1991).
*Survival Analysis, A Pratical Approach*, Mahesh K.B. Parmar and David Machin (1995).

* cited by examiner

*Primary Examiner*—R. Weisberger
(74) *Attorney, Agent, or Firm*—Priest & Goldstein, PLLC (57) ABSTRACT

Systems and processes for more accurate mortgage scoring are described. A proportional hazards model is employed in which not only the occurrence of an event, but also the time to an event such as default of a loan, is considered. In this approach, a hazard rate can be viewed as the chance that an observation will experience an event in the next instant. There are two components to the response, and a binary variable is utilized to indicate whether the event was observed or not, and a time variable. As a result, the number of loans used for modeling is greatly increased, and the time it takes to observe the event, a valuable piece of information in itself, is included in the process. In addition, nonlinear effects are advantageously modeled in a continuous fashion using hat functions to map a series of independent variables. This approach typically yields smaller prediction errors near boundary points.

18 Claims, 7 Drawing Sheets

FIG. 9 under the following detailed description taken together with the accompanying drawings.

METHODS AND APPARATUS FOR UTILIZING A PROPORTIONAL HAZARDS MODEL TO EVALUATE LOAN RISK

FIELD OF THE INVENTION

The present invention relates generally to improved methods and apparatus for providing an indication of risk or for predicting the default probability of a loan at the time of origination based upon the information available at the time of the loan application. More particularly, the present invention relates to advantageous techniques for improved regression analysis to compute the indication of risk or the probability of default, and to provide more accurate mortgage scoring.

BACKGROUND OF THE INVENTION

The technique of logistic regression has been previously used to compute a mortgage score indicative of risk or the probability of default of a loan. A typical form for modeling this regression analysis is: $\ln(p/(1-p))=X\beta$. In this model, X is a vector of independent variables, $\beta$ is a vector of regression coefficients, and p is the probability that the loan will default.

One shortcoming of this method of computation is that the definition of default must contain a time window. For example, default may be defined as "default over the life of the loan". However, this definition has the unpleasant side effect of treating the following two loans equally: (1) a loan which was observed for 15 years with no default, and (2) a loan which was observed for 1 year with no default. Clearly, the information contained in these two loan histories is not equivalent. Logistic regression with the above defined time window, however, would treat these loans equivalently because neither of these loans defaulted during the life of the loan.

One fix would be to only use loans that were observed for the entire response window. That is, loans that were originated recently would not be considered in the modeling process. However, since the best information is often the most recent, this approach is not a very effective option except for the case where the time window is very short. Using a very short time window for mortgages is not practical, however, because the majority of defaults occur after the first year. These and a variety of other problems are presented by typical prior art loan scoring techniques.

SUMMARY OF THE INVENTION

The present invention recognizes that it will be highly advantageous to address such problems in the computation of default risk, as well as other mortgage related calculations, which arise utilizing typical prior art logistic regression tools.

In one aspect of the present invention a mortgage score is computed utilizing an improved statistical model that more accurately predicts an indication of risk or the probability of borrower default on a mortgage loan. Unlike standard credit scores which are determined only from credit bureau data, mortgage scores incorporate credit bureau data, but also consider additional data. A mortgage score determined in accordance with the present invention also preferably reflects mortgage information, such as property data, loan-to-value (LTV) ratio, and loan type; market data, such as unemployment rate, housing inventory, and the like; and collateral forecasts, as addressed in greater detail below. It will be recognized that the particular data and variables analyzed may vary. In a presently preferred embodiment, proportional hazard models are employed to further improve the predictive value of the overall model, and the process is embodied in a system with highly effective graphics making it highly intuitive to use. The improved ability to predict makes a scoring tool in accordance with the present invention more effective than previous scoring tools. More recent data is more readily added to the system, new variables can be more accurately recognized as risk drivers, and old variables are used more effectively. In a presently preferred embodiment, hat functions are also advantageously employed. Continuous variables and continuous scoring provide a host of advantages addressed in greater detail below. Further, the system can fully take advantage of the benefits of electronic commerce and be implemented in such a context so that decision making can be made with the speed that customers have come to expect when using the Internet.

The end result is a model that is more accurately predictive than credit scores alone. Among the advantages are that the resulting mortgage scores are more predictive of default or delinquency, and their use results in improved risk management, as well as confidence in the ultimate loan decision. Loan originators can increase volume, minimize delinquencies, and improve profitability. Originators can rely on fast, consistent decisions and increased approval rates. Conduits can sell loans more quickly and limit buy-backs. Investors can more accurately price loans. Borrowers can expect consistent treatment and fast turnaround.

The proportional hazards model does not employ a solely binary response. As addressed in further detail below, proportional hazards models are models which consider not only the occurrence of some response or event, but also the time to event, such as a time to default or a time to loss in the mortgage context. For models with fixed covariates, in other words, not varying over time, the basic premise is that there is a baseline hazard rate which varies with time. This baseline hazard rate is adjusted in proportional fashion according to the covariate picture.

These and other features, aspects and advantages of the invention will be apparent to those skilled in the art from the following detailed description taken together with the accompanying drawings.

DETAILED DESCRIPTION

Figure 1:
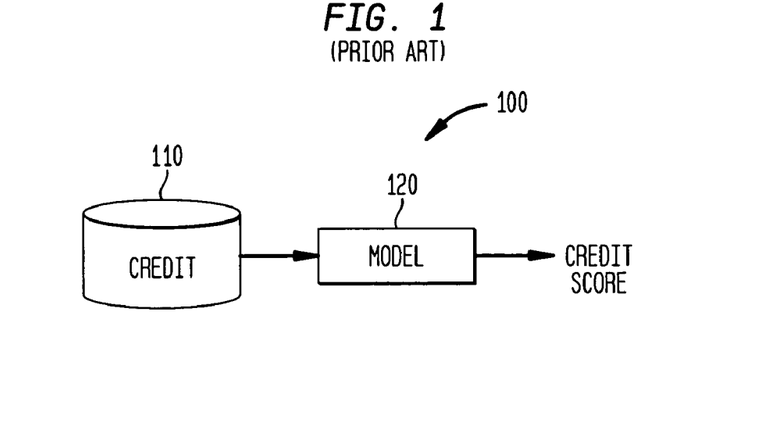
FIGS. 1 and 2 comparatively illustrate prior art credit scoring and mortgage scoring generally.
Figure 2:
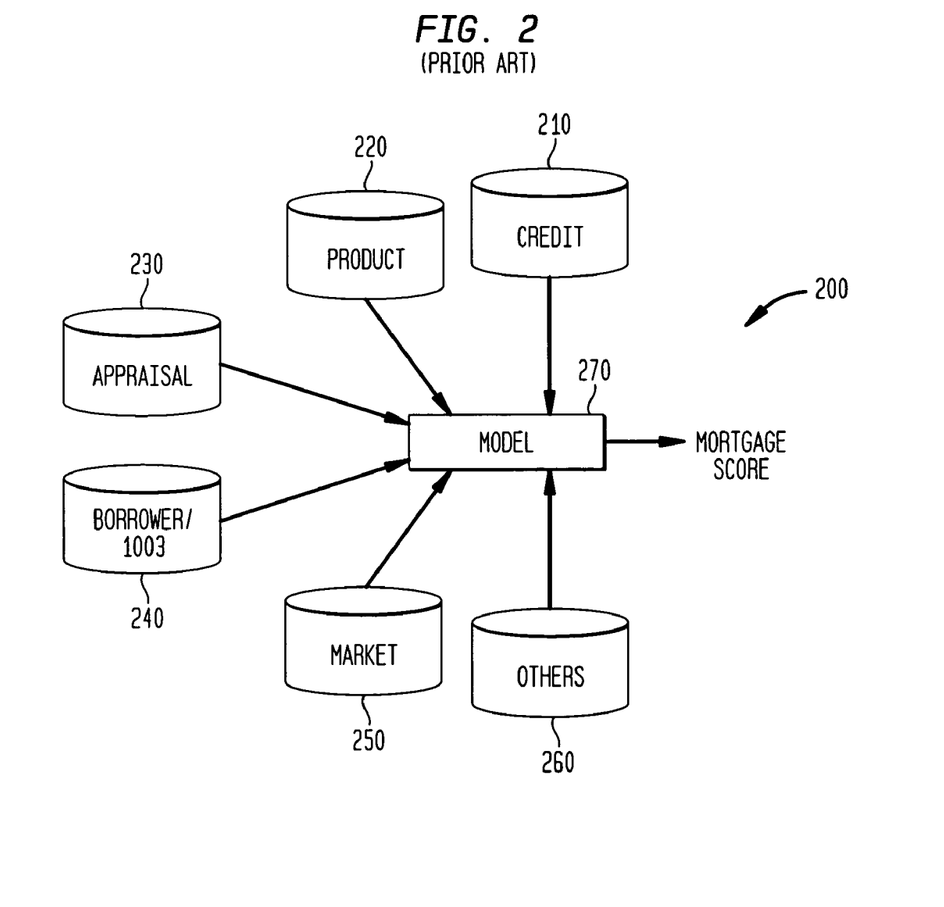

FIGS. 1 and 2 illustrate very generally a prior art credit scoring system 100 and a prior art mortgage scoring system 200. In the credit scoring system 100, credit bureau data is stored in a credit database 110, and a credit scoring model 120, typically implemented in a computer with appropriate operating software, operates on that data to produce a credit score. By contrast, in mortgage scoring system 200, credit bureau data, product data, appraisal data, borrower data, market data and other data are stored in database segments 210, 220, 230, 240, 250 and 260 of a database and all these different types of data are operated upon by mortgage scoring model 270, again typically implemented in a programmed computer, to produce a mortgage score. The systems 100 and 200 may utilize logistic regression analysis as described above in calculating their respective scores.

Figure 3:
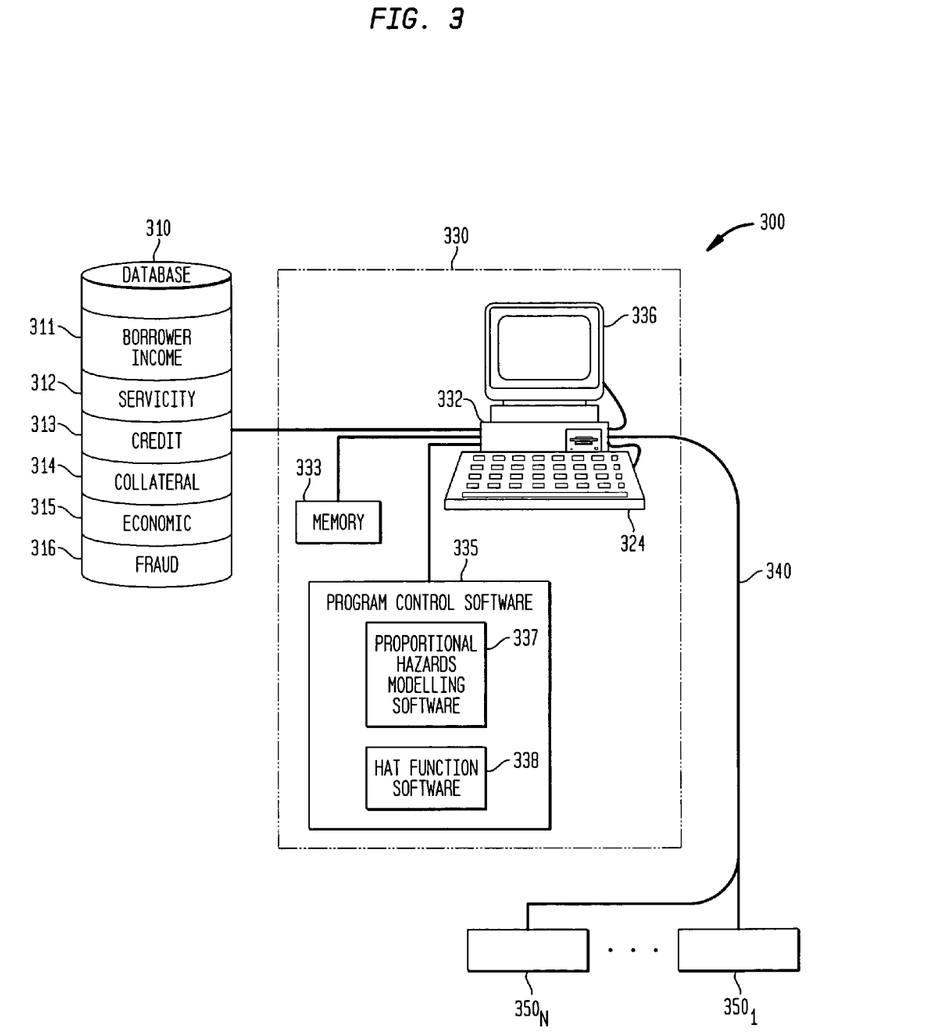
FIG. 3 illustrates a system for mortgage scoring suitable for use in an electronic commerce environment in accordance with the present invention.

FIG. 3 illustrates a system for mortgage scoring 300 in accordance with the present invention. In system 300, a database 310 provides input data to a mortgage score modeling computer 330 represented as having a processor 332, with an input, such as a keyboard 334, and an output, such as display 336. The computer 330 may be suitably implemented as a server from Sun Microsystems running a Unix™ operating system, or utilizing other hardware and software as desired consistent with the volume of data to be processed and like system demands. Computer 330 also has memory 333 for storage and memory 335 for program control software for controlling operation of the computer 330. The program control software includes mortgage score modeling computation software in accordance with the present invention, such as proportional hazards modeling software 337 and software 338 for a model employing hat functions as addressed further below. The computer 330 is connected through a network or other connection 340 to customer computers $350_1$ through $350_N$ which may be located at the offices of a plurality of mortgage originators, by way of example.

Turning to further aspects of database 310, it is preferably developed by storing data for a large number of loans which are both geographically dispersed and dispersed by market type. This data may be organized in segments, such as borrower income 311, servicing data 312, credit data 313, collateral data 314, economic data 315 and fraud data 316, as shown in FIG. 3, but it will be recognized that additional segments or fewer segments may be employed as desired, and that the segments shown in FIG. 3 are exemplary only. Data, such as default data will be stored with two components, an event observation component and a time to event component as addressed further below.

Metropolitan statistical areas (MSAs), the regions used by the Federal government to facilitate data collection, are advantageously utilized to further segment the data by geographic region and risk assessment is preferably computed for mortgage originations by region. Loan types are also segmented by type, such as conforming, jumbo, adjustable rate (ARM), fixed rate, or other types, so that the model for a given type of loan is developed from an analysis of loans of that type. Borrower data, such as any data typically collected in the prior art as the data 240 of FIG. 2, or credit and collateral data 313 and 314 of FIG. 3, for in excess of one million borrowers from a large number of different loan forms is also stored in a presently preferred embodiment. The modeling software 335 may advantageously consider more than 20 variables, such as housing affordability, housing supply demand, home price dynamics, employment dynamics for an MSA, income and debt factors, growth or decline of businesses, MBA delinquency information, employment factors, housing construction dynamics, and home price dynamics for the state of origination, as well as, borrower credit, capacity, collateral, loan product attributes and market rating, on each loan on an ongoing basis. Again, it will be noted that the above variables are exemplary.

The system of FIG. 3 addresses various modeling challenges of the prior art by using a proportional hazards model implemented in software, such as software 337. With the proportional hazards model of the present invention, the models employed can be more readily updated on an ongoing basis to reflect the latest data, current trends, market needs, legal requirements and the like. Proportional hazards models are models which consider not only the occurrence of some response, but also the time to event such as time to default. For models with fixed covariates or, in other words covariates that are not varying over time, the basic premise is that there is a baseline hazard rate which varies with time. This baseline hazard rate is adjusted in a proportional fashion according to the covariate picture.

One form of the model is: $h(t|Z)=h_0(t)*exp(\beta^T Z)$ where: $h(t)$ is the hazard rate at time t, $h_0(t)$ is the baseline hazard rate at time t, Z is the vector of covariates, and $\beta$ is a vector of regression coefficients. The hazard rate can be viewed as the chance that an observation will experience the event in the next instant. For mortgage scoring, the event of interest may be default. So, loans can be compared with respect to their probability of defaulting in the next instant. As a consequence, the higher the probability of default, the lower the quality of the mortgage. In this type of model, there are two components to the response. A binary variable which indicates whether the event was observed or not, and a time observed variable. The time observed variable would be the time to an event, or in the case that the event was not observed, the time until the observation was censored. For mortgage scoring, censoring can occur for reasons such as the end of study or the prepayment of the loan. By using this methodology, the number of loans used for the modeling process is greatly increased. No longer do loans that were not observed for the entire time window as defined for purposes of logistic regression need to be discarded. Also, the time it takes to observe the event is a valuable piece of information that should be included in the modeling process.

Various advantages of the proportional hazards model can be illustrated by an example. Exemplary inputs to a logistic regression model with a binary response defined as a one for a mortgage claim within a one year observation window or a zero when a mortgage claim has not been made within one year appear in columns 1-4 of the table below:

| Obs | Time Observed | Reason for termination | Logistic Response (at the end of 1 year or 365 days) | PH response |
|---|---|---|---|---|
| 1 | 100 days | Claim | 1 | Claim |
| 2 | 200 days | Prepayment | 0 | Not Claim |
| 3 | 200 days | End of study | N/A | Not Claim |
| 4 | 400 days | Claim | 0 | Claim |
| 5 | 400 days | Prepayment | 0 | Not Claim |
| 6 | 300 days | End of study | N/A | Not Claim |
| 7 | 400 days | End of study | 0 | Not Claim |

In the usual logistic regression case, an observation must have the opportunity to be observed for the entire response window. Here, the response window is one year. Observations 3 and 6 could not be observed for that entire time window. Thus, the not applicable (N/A) entry in column 4 of the table above, and their exclusion from the model building process under this formulation.

While, observations 3 and 6 must be excluded from the analysis under the traditional logistic regression methodology, the proportional hazards methodology improves upon this treatment by utilizing the available information for observations 3 and 6. That is, the information that these two observations did not go to claim for some period of time would be utilized in the model. These observations would then be treated as censored observations at the time they were no longer observed. This improved use of data leads to a better risk estimate.

Also, under the usual logistic regression model formulation, observations 4 and 5 are treated equivalently. At the point in time that the binary response is formed, this equivalence is true. However, the proportional hazards methodology would be able to capture the additional information that observation 4 went to claim after 400 days. This methodology also takes into account the fact that observation 5 was observed for 400 days without a claim. So, the proportional hazards methodology has the benefit of using the information that observation 5 lasted for more than a year and observation 4 lasted for more than a year, but eventually went to claim. The use of this additional information also leads to a better estimate of risk.

A further challenge addressed by the present invention is to appropriately model continuous independent variables whose effects on the dependent variable are nonlinear in multivariate space. One prior art approach attempted to solve this challenge by creating a series of binary variables for each continuous independent variable. These binary variables were created using an algorithm that searched for the optimal breakpoints of the continuous variable given its relationship to the dependent variable. This series of binary variables was created with the constraint that $\Sigma X_i = 1$. That is, exactly one of the set of binary variables would be 1, while the rest of the variables would be 0. The values of the $X_i$ were determined by a Boolean membership function over disjoint subsets over the range of X. For example, X is mapped to $X_1, X_2, X_3, X_4$ where X is a continuous variable in a range [0,100] and the $X_i$ are binary variables. The $X_i$ are defined by the following rules:

$$X_1 = 1 \text{ for } 0 \leq X \leq 25$$
$$= 0 \text{ otherwise;}$$
$$X_2 = 1 \text{ for } 25 < X \leq 50$$
$$= 0 \text{ otherwise;}$$
$$X_3 = 1 \text{ for } 50 < X \leq 75$$
$$= 0 \text{ otherwise; and}$$
$$X_4 = 1 \text{ for } 75 < X \leq 100$$
$$= 0 \text{ otherwise.}$$

Figure 4:
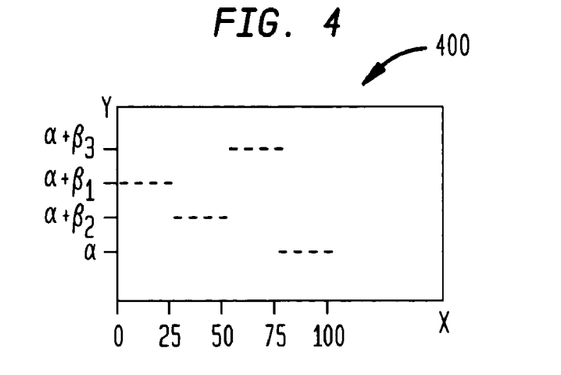
FIG. 4 illustrates a prior art modeling approach.

In order to fit the model, the $X_i$ are used as independent variables rather than X. This allows the regression technique to fit a nonlinear relationship. Utilizing this approach, the resulting model would be: $Y = \alpha + X_1 \beta_1 + X_2 \beta_2 + X_3 \beta_3 + \epsilon$ which would appear as illustrated in graph 400 of FIG. 4. This figure illustrates why this type of model fit is commonly referred to as a "step function". One of the shortcomings of this method lies in how observations which have a value of X that is near a membership function boundary are handled. In the above example, an observation that had X=25 would yield a prediction of $\alpha + \beta_1$. Conversely, an observation with X=26 would yield a prediction of $\alpha + \beta_2$. $|\beta_1 - \beta_2|$ is large, the predictions are much different. This difference will yield large prediction errors if the true relationship between X and Y takes on a continuous form in this region.

Typical prior art approaches were subject to these large prediction errors for some loan applications. These prediction errors were brought about through the use of binary variables for modeling the effect of continuous risk drivers such as loan to value ratio (LTV). In the above example, say X represents LTV. If a model output consisted of a scorecard with only LTV as an independent variable, then the $\beta$'s would represent the scorecard weights. The risk evaluation of a loan application would be the sum of the weights. If $\beta_1 = 75$, $\beta_2 = 65$, $\beta_3 = 50$ and $\alpha = 10$, then a loan application with LTV=75 will be represented by the model as $(\alpha + \beta_3)$ or 60. Meanwhile, a loan application with LTV=76 will be represented by $\alpha$ or 10. So, the difference in risk evaluation is 50 points. However, a third loan application with LTV=90 will also be represented by $\alpha$, or 10. Thus, our example results in the following table illustrating these three loan applications:

| Loan Application | LTV | Risk Evaluation |
|---|---|---|
| 1 | 75 | 60 |
| 2 | 76 | 10 |
| 3 | 90 | 10 |

The difference in risk evaluation between the third loan (LTV=90) and the first loan (LTV=75) is 50. This difference is the same as that of the first two loan applications. Given the continuous nature of the relationship between risk and LTV, this model fit does not seem appropriate. This type of model fit may work well on average, but clearly there are some opportunities for improvement.

The present invention avoids this particular problem and provides much needed improvement by using "hat" functions as described further below. Hat functions allow nonlinear effects to be modeled in a continuous fashion rather than using step functions. Hat functions are similar to using a series of binary variables in the sense that the independent variable X is mapped to a series of independent variables $X_i$ which meet the constraint $\Sigma X_i = 1$. There are, however, at least two fundamental differences: (1) The $X_i$ are no longer binary variables, but are continuous variables over [0,1], (2) the subsets over which the $X_i$ are defined are not disjoint. Each $X_i$ is defined by a fuzzy membership function. $X_i$ is a fuzzy number, with its value defined by a measure of distance from the number. Hat functions use a linear decay to define the distance from the number which also is called the "degree of membership".

Figure 5:
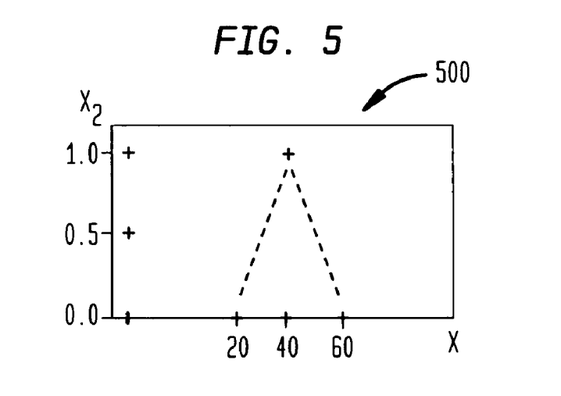
FIGS. 5-8 illustrate various aspects of the use of hat functions as employed by the present invention.

Continuing with the previous example, say $X_2$ is a fuzzy number reaching a value of 1 at X=40 and is nonzero over the range (20,60). For use in hat functions, the value of $X_2$ would appear as illustrated in graph 500 of FIG. 5. Mathematically, it can be said that:

$$X_2 = 0 \text{ for } X \leq 20 \text{ or } X \geq 60$$
$$X_2 = 1 \text{ for } X = 40$$
$$X_2 = (X - 20)/(40 - 20) \text{ for } 20 < X < 40$$
$$X_2 = (60 - X)/(60 - 40) \text{ for } 40 < X < 60$$

Figure 6:
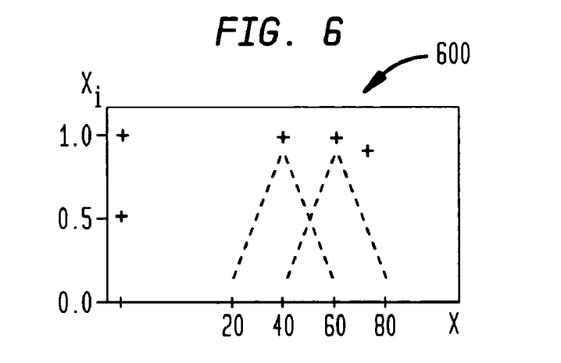

For "hat" functions, $X_3$ would be constructed to be complementary to $X_2$. Thus, if $X_3$ was defined to be nonzero over the interval (40,80), the graph 600 of FIG. 6 would result. These results are quantified or described as follows:

$X_3 = 0$ for $X \leq 40$ or $X \geq 80$, $X_3 = 1$ for $X = 60$, $X_3 = (X - 40)/(80 - 60)$ for $40 < X < 60$, and $X_3 = (80 - X)/(80 - 60)$ for $60 < X < 80$.

Figure 7:
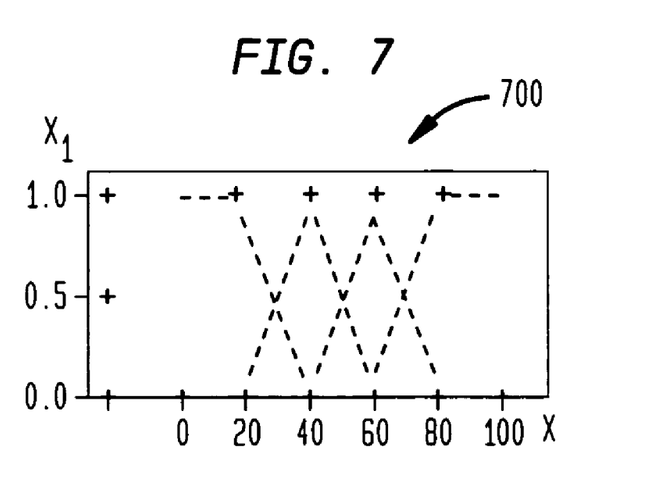

For the upper and lower ends of the range of X, the membership function must take on a different form to conform to the constraint that $\Sigma X_i = 1$. For these cases, the function increases or decreases to or from 1 based on the distance to the midpoint of the previous or next $X_i$, respectively. For the example, $X_1$ and $X_4$ would take on the form shown in the graph 700 of FIG. 7. In graph 700, $X_1 = 0$ for $X \leq 0$ or $X \geq 40$ and $X_4 = 0$ for $X \leq 60$ or $X > 100$ $X_1 = 1$ for $0 \leq X \leq 20$ $X_1 = (40 - X)/(40 - 20)$ for $20 < X < 40$ $X_4 = 1$ for $80 \leq X \leq 100$ $X_4 = (80 - X)/(80 - 60)$ for $60 < X < 80$ The $X_i$ values are used to fit the model, and the model is of the form: $Y = \alpha + X_1\beta_1 + X_2B_2 + X_3\beta_3 + \epsilon$. The predictions, however, would be:

at $X = 25$, $Y_{hat}(25) = \alpha + X_1(25)\beta_1 + X_2(25)\beta_2$ where $X_i(j) = X_i$ at $X = j$ at $X = 26$, $Y_{hat}(26) = \alpha + X_1(26)\beta_1 + X_2(26)\beta_2$ The difference between these predictions is: $(Y_{hat}(25) - Y_{hat}(26)) = \beta_1 *(X_1(25) - X_1(26)) + \beta_2 *(X_2(25) - X_2(26))$. This difference in the predictions is likely to be a better estimate of the difference in the response for these two observations than the difference using the step function methodology. This approach should yield smaller prediction errors near the boundary points as illustrated in graph 800 of FIG. 8.

For example, say, as before, scorecard is built based on a model that only considered LTV. This time, however, hat functions as discussed above are used rather than binary variables. The differences in risk evaluations based on LTV will not appear as they did when the model was built using the prior art's binary variables. Before, the cases where LTV=75, 76 and 90 were considered. These same cases are considered again with the above discussed hat functions and $\alpha=10$, $\beta_1=75$, $\beta_2=65$, and $\beta_3=50$. Now, with hat functions, the risk evaluation of the loan application with LTV=75 is given by $\alpha+0.25*\beta_3=22.5$ (since $X_3$ evaluated at 75 is 0.25). At LTV=76, the risk evaluation is by $\alpha+0.20*\beta_{3=20}$ ($X_3$ evaluated at 76 is 0.20). Finally, the risk evaluation at LTV=90 yields $\alpha$, or 10. Summarizing, the table below results:

| Loan Application | LTV | Risk Evaluation |
|---|---|---|
| 1 | 75 | 22.5 |
| 2 | 76 | 20 |
| 3 | 90 | 10 |

This model fit enables a much more reasonable representation of the underlying relationship between risk and LTV. That is, the model fit enables similar LTVs to generate similar risk evaluations. Meanwhile, LTVs that are not similar generate risk evaluations which are appropriately dissimilar.

Figure 9:
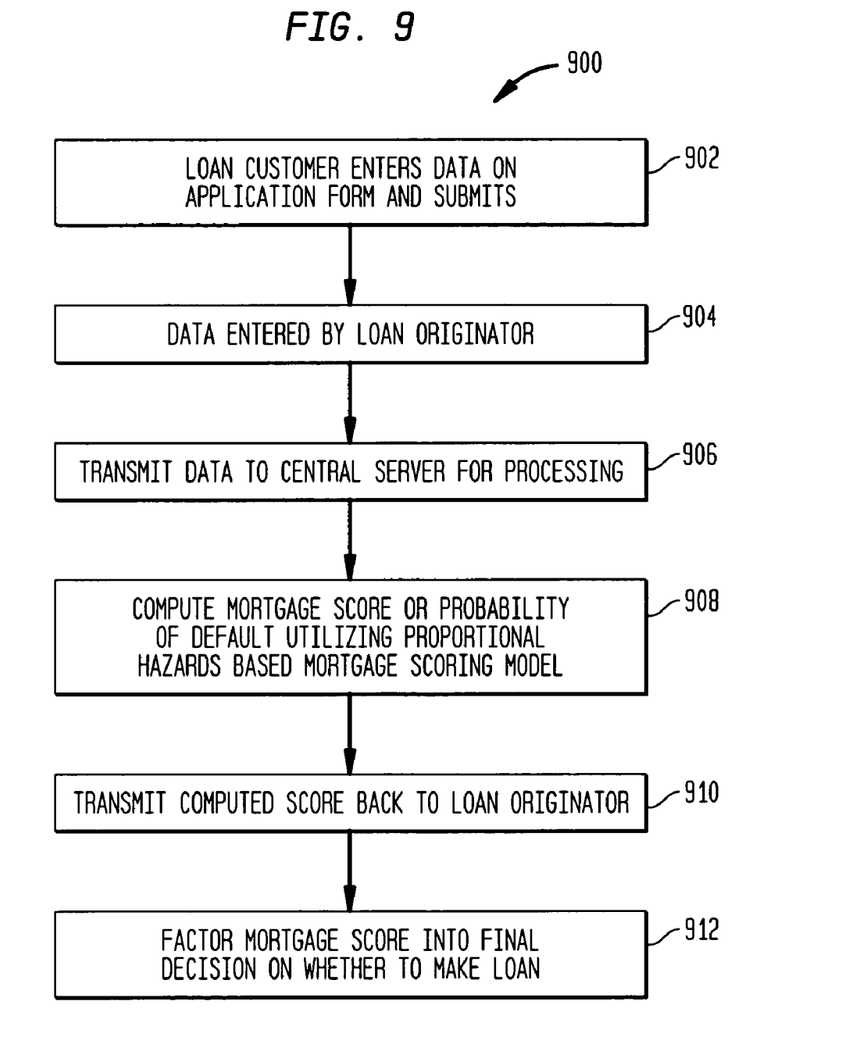
FIG. 9 illustrates a proportional hazards based process of mortgage scoring in accordance with the present invention.

FIG. 9 illustrates a proportional hazard based process 900 of mortgage scoring in accordance with the present invention. In step 902, a customer seeking a loan enters data on an application form and submits his or her application for a loan. Alternatively, in a web-based environment, the application might be filled out using a personal computer and submitted through an Internet connection either to a mortgage lender or directly to a mortgage scorer. In step 904, data from the loan application is keyed in or otherwise entered by an employee of a loan originator. By way of example, this employee may use a keyboard which is part of one of the customer computers $350_1$ through $350_n$ of FIG. 3.

In step 906, the data is transmitted to a central server for processing. This server may suitably be a computer, such as a computer 330 of FIG. 3 and this data may be transferred over a network connection, such as the Internet, with appropriate encryption for security, or over a dedicated phone line or other electronic data interface, as desired. Once the data is safely received, in step 906, a proportional hazards based mortgage scoring model is applied to the data and a mortgage score or probability of default is computed in step 908. As addressed above, the proportional hazards model in accordance with the present invention is of the form $h(t|Z) = h_0(t)*\exp(\beta^T z)$ and takes into effect two components: both a binary variable indicating whether an event, such as default was observed or not, and a time observed variable which is either the time to the event, such as the time from loan origination to default, or the time until observation was censored, for example, the loan was prepaid after two years. Among its many advantages, this approach allows a long window of observation to be employed while also allowing new loan data to be added and updated on an ongoing basis as it becomes available.

In step 910, this computed score, an indication of loan risk, such as a score between zero and one thousand, is transmitted back to the loan originator. In a presently preferred embodiment, this score will be accompanied with an automatically generated report which highlights the particular data substantially contributing to the score so that the loan originator can more intelligently gauge whether to make the loan or not. By way of example, the automatically generated report may highlight that a poor mortgage score is based largely on the data that a loan applicant has only recently moved to a geographic area and that he or she has been employed in a new job for only a short time. A loan officer may know the applicant's long family ties to the area and choose to override a low mortgage score which was highlighted as low based on these two factors. While this example may be simplistic, it serves to illustrate a further aspect of the present invention.

In step 912, the mortgage score is factored into a final decision as to whether or not to make the loan. The improved accuracy of the proportional hazards model flowing from its ability to be more readily updated on an ongoing basis to reflect the latest data, current trends, market needs, legal requirements and the like, and its ability to factor in the time to an event should result in more accurate decisions and a lowered default rate.

Figure 10:
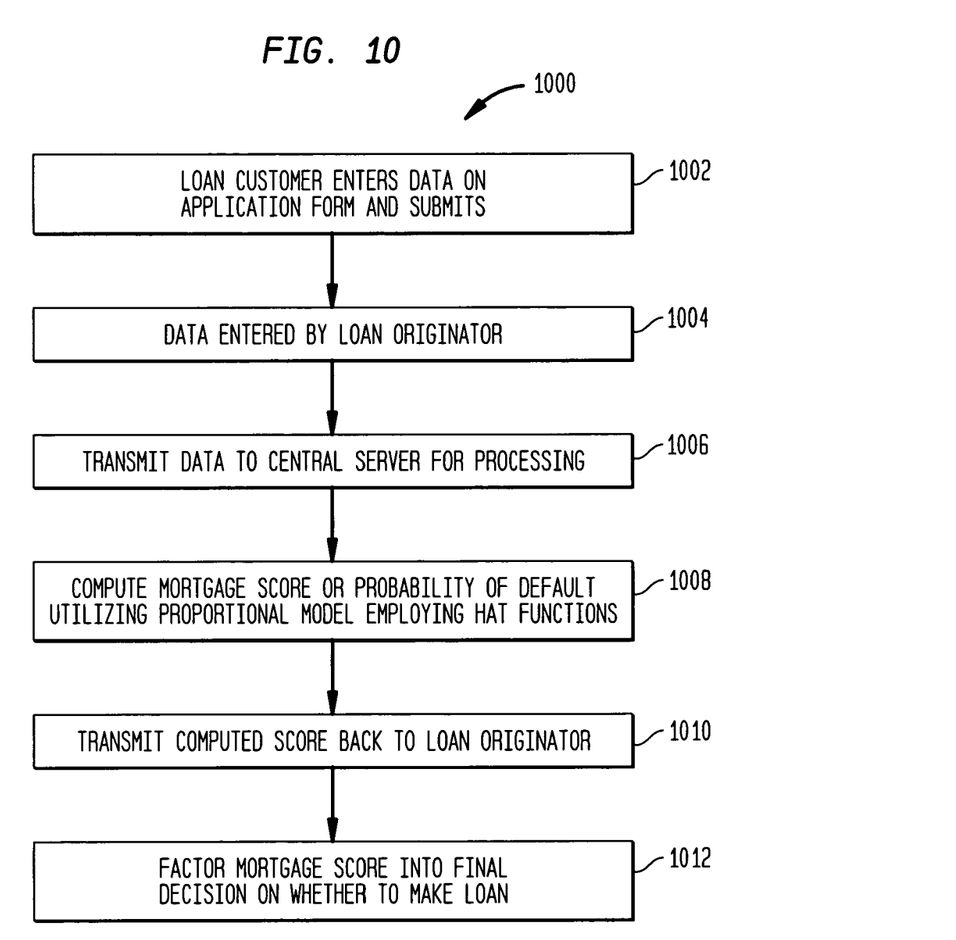
FIG. 10 illustrates a process of mortgage scoring employing a model using hat functions in accordance with the present invention.

FIG. 10 illustrates a process of mortgage scoring 1000 employing a model using hat functions in accordance with the present invention. In step 1002, a customer seeking a loan enters data on an application form and submits his or her application for a loan. Alternatively, in a web-based environment, the application might be filled out using a personal computer and submitted through an Internet connection either to a mortgage lender or directly to a mortgage scorer. In step 1004, data from the loan application is keyed in or otherwise entered by an employee of a loan originator. By way of example, this employee may use a keyboard which is part of one of the customer computers $350_1$ through $350_n$ of FIG. 3.

Figure 8:
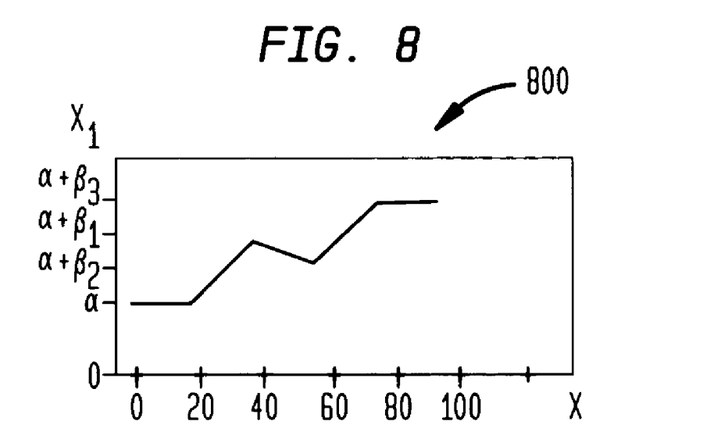

In step 1006, the data is transmitted to a central server for processing. This server may suitably be a computer, such as a computer 330 of FIG. 3 and this data may be transferred over a network connection, such as the Internet, with appropriate encryption for security, or over a dedicated phone line or other electronic data interface, as desired. Once the data is safely received, in step 1006, a model employing hat functions is applied to the data and a mortgage score or probability of default is computed in step 1008. As addressed above, the model employing hat functions in accordance with the present invention allows nonlinear effects to be modeled in a continuous fashion rather than using step functions. Among its many advantages, this approach advantageously should yield smaller prediction errors near boundary points as illustrated in FIG. 8 and discussed above. It will be recognized that in a presently preferred embodiment of the present invention both proportional hazards and hat functions will be employed in combination.

In step 1010, this computed score is transmitted back to the loan originator. In a presently preferred embodiment, this score will be accompanied with an automatically generated report which highlights the particular data substantially contributing to the score so that the loan originator can more intelligently gauge whether to make the loan or not. By way of example, the automatically generated report may highlight that a poor mortgage score is based largely on the data that a loan applicant has only recently moved to a geographic area and that he or she has been employed in a new job for only a short time. A loan officer may know the applicant's long family ties to the area and choose to override a low mortgage score which was highlighted as low based on these two factors. While this example may be simplistic, it serves to illustrate a further aspect of the present invention.

In step 1012, the mortgage score is factored into a final decision as to whether or not to make the loan. The improved accuracy of the proportional hazards model flowing from its ability to be more readily updated on an ongoing basis to reflect the latest data, current trends, market needs, legal requirements and the like, and its ability to factor in the time to an event should result in more accurate decisions and a lowered default rate.

Figure 11:
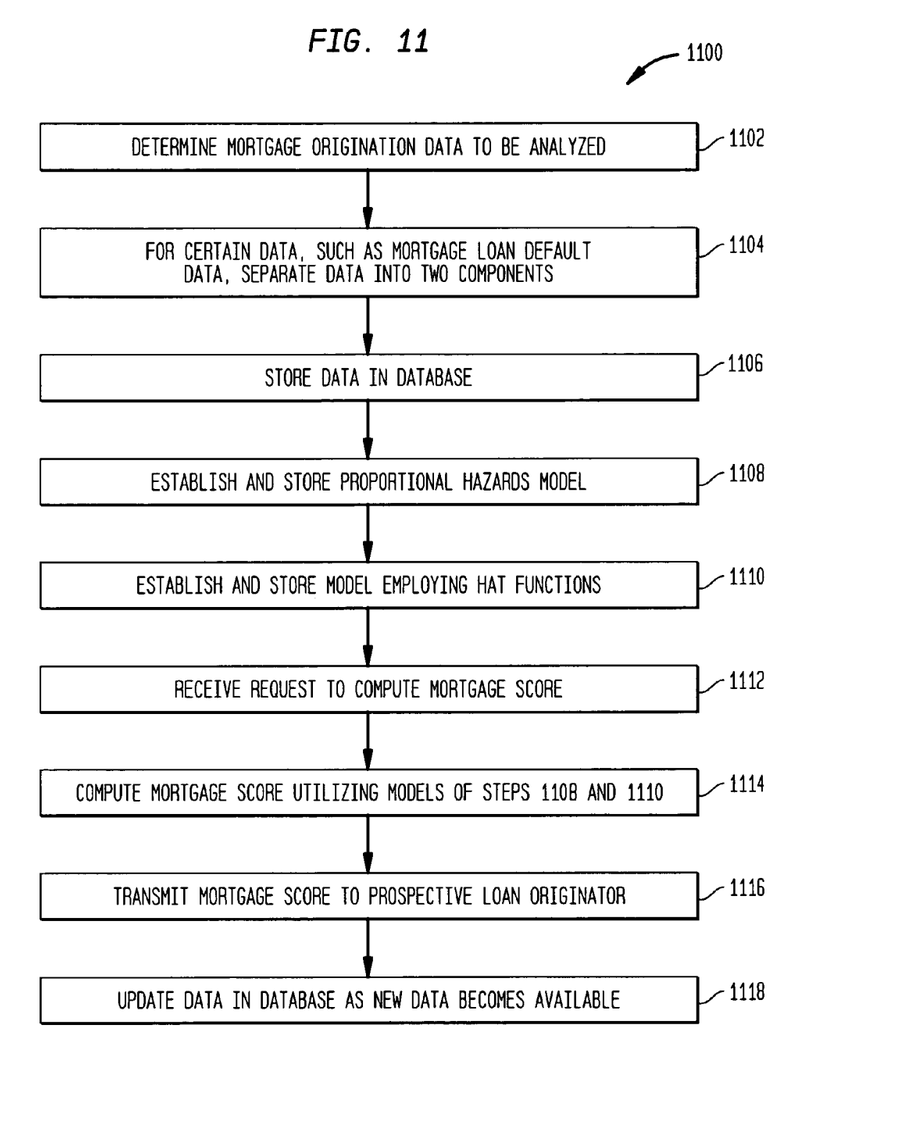
FIG. 11 illustrates an overall process employing both proportional hazards and hat functions in accordance with the present invention.

FIG. 11 illustrates an overall process 1100 employing both proportional hazards and hat functions in accordance with the present invention. In step 1102, the mortgage origination data to be analyzed is determined. This data may comprise the data stored in segments 311-316 of FIG. 3, as well as, other additional data as desired. At least for certain data, such as mortgage loan default data, the data is preferably separated into two components, a binary variable indicating whether the event was observed or not, and a time observed variable which is either the time to the event, or if the event has not been observed, the time until the observation was censored. In step 1104, the data is stored in a database, such as database 310, for subsequent computations. In step 1106, a proportional hazards model is established and stored, such as software 337.

In step 1108, a model employing hat functions is established and stored, such as software 338. In step 1110, a request to compute a mortgage score or to determine a probability of default is received from a prospective loan originator or some other requester along with a loan applicant's loan application data. In step 1112, the mortgage score is computed utilizing the models established in steps 1108 and 1110. In step 1114, the computed mortgage score is transmitted to the prospective loan originator. In step 1116, or at any time during the process 1100, as additional new mortgage origination data becomes available, the database may be updated to include this new data so that subsequent computations will be based on the most up to data and the fullest set of available data.

One example of the utilization of hat functions within a proportional hazards regression model in accordance with the present invention follows below. It will be recognized that these approaches may be applied to other variables as desired. Incorporating the hat functions within the proportional hazards framework yields a model which can be expressed by $h(t|Z)=h_0(t)^* \exp(\beta^T Z)$. In this equation t is some point in time, Z is a vector of loan characteristics, $Z=\{Z_1, Z_2, Z_3, Z_i, \ldots, Z_n\}$, $h(t|Z)$ is the hazard rate for a loan with characteristics Z at time t, $h_0(t)$ is the baseline hazard rate at time t, and $\beta$ is a vector of regression coefficients as fit by a proportional hazards regression.

The loan characteristics, as utilized in the regression model, can take on various forms. For instance, $Z_1$ may be a continuous variable such as LTV, while $Z_2$ may be a binary indicator variable such as "investor loan". $Z_3$ through $Z_6$ may be hat function variables (formed as given in the previous example) representing one idea, such as assets. The other $Z_i$ can similarly take on various forms.

The result from this model is a hazard rate at time t based on the loan characteristics (e.g. LTV, assets, investor). This hazard rate can be used to compare loans in terms of risk. That is, a loan would be deemed to be of lower quality if it was associated with a higher hazard rate. With this information, decisions concerning documentation requirements, pricing and credit policy can be made with greater clarity.

While the present invention has been disclosed in the context of a number of presently preferred embodiments, it will be recognized that many variations may be made to adapt the present teachings to other contexts consistent with the claims which follow.

We claim:

1. A method for providing an indication of risk of a loan contemporaneously with origination of the loan, the method comprising the steps of:
receiving mortgage loan data for an applicant for a loan, said mortgage data including data regarding occurrence of an event relevant to the loan and also time to the event;
analyzing the received data utilizing a proportional hazards model to take into consideration not only the occurrence of an event relevant to the loan, but also the time to the event;
computing the indication of risk for the loan using a computer with memory;
transmitting the computed default probability for the loan; and
additionally analyzing the received data utilizing a hat function model to allow nonlinear effects to be modeled in a continuous fashion.

2. The method of claim 1 wherein the indication of risk is a probability of default.

3. The method of claim 1 wherein the proportional hazards model is of the form: $h(t|Z)=h_0(t)^*\exp(\beta^T Z)$, where h(t) is a hazard rate at time t, Z is a vector of covariates, and $\beta$ is a vector of regression coefficients.

4. The method of claim 3 wherein the hazard rate represents a risk of default.

5. The method of claim 4 wherein the hazard rate is represented by a binary variable which indicates whether default was observed or not, and a time observed variable.

6. The method of claim 5 wherein the time observed variable is either a time to default or if default did not occur, a time until observation was censored.

7. The method of claim 5 further comprising the step of:
storing in a database the binary variables and the time observed variables for a plurality of past loans.

8. The method of claim 1 wherein an independent variable, X, is mapped to a series of independent variables $X_i$ which meet the constraints that $X_i$ is a continuous variable over the range [0,1] and each $X_i$ is defined by a fuzzy membership function.

9. The method of claim 1 further comprising the step of:
transmitting a report to a potential loan originator including the indication of risk and highlighting a variable or variables recognized as contributing to the computed indication of risk in a substantial way.

10. The method of claim 9 wherein the indication of risk is a probability of default.

11. A system for predicting a default probability of a loan contemporaneously with origination of the loan, the system comprising:
a server receiving mortgage loan data for an applicant for a loan;
the server including a programmed processor operable to analyze the received data utilizing a software based proportional hazards model;
the server further operable to compute the default probability for the loan; and
a communication mechanism to transmit the computed default probability, wherein the server is further operable to analyze the received data utilizing a hat function model to allow nonlinear effects to be modeled in a continuous fashion.

12. The system of claim 11 wherein the proportional hazards model is of the form: $h(t|Z)=h_0(t)*exp(\beta^T Z)$, where h(t) is a hazard rate at time t, Z is a vector of covariates, and $\beta$ is a vector of regression coefficients.

13. The system of claim 11 wherein the hazard rate represents a risk of default.

14. The system of claim 13 wherein the hazard rate is represented by a binary variable which indicates whether default was observed or not, and a time observed variable.

15. The system of claim 14 wherein the time observed variable is either a time to default or if default did not occur, a time until observation was censored.

16. The system of claim 14 further comprising:
a database storing the binary variables and the time observed variables for a plurality of past loans.

17. The system of claim 11 wherein an independent variable, X, is mapped to a series of independent variables $X_i$ which meet the constraints that $X_i$ is a continuous variable over the range [0,1] and each $X_i$ is defined by a fuzzy membership function with said mapping stored in a memory.

18. The system of claim 11 further comprising:
means for automatically generating and transmitting a report to a potential loan originator including the computed probability of default and highlighting a variable or variables recognized as contributing to the computed probability of default in a substantial way.

* * * * *